April 2, 1963 — M. G. HUNTINGTON — 3,083,471
APPARATUS FOR CONTINUOUS AND UNIFORM CONTACTING OF FLUIDS AND SOLIDS
Filed March 24, 1960 — 3 Sheets-Sheet 1

INVENTOR
Morgan G. Huntington
BY Sughrue, Rothwell, Mion & Zinn
ATTORNEYS

April 2, 1963 M. G. HUNTINGTON 3,083,471
APPARATUS FOR CONTINUOUS AND UNIFORM CONTACTING
OF FLUIDS AND SOLIDS
Filed March 24, 1960 3 Sheets-Sheet 2

April 2, 1963  M. G. HUNTINGTON  3,083,471
APPARATUS FOR CONTINUOUS AND UNIFORM CONTACTING
OF FLUIDS AND SOLIDS
Filed March 24, 1960  3 Sheets-Sheet 3
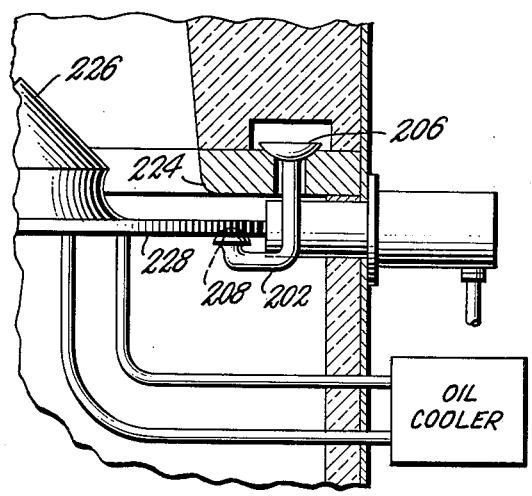
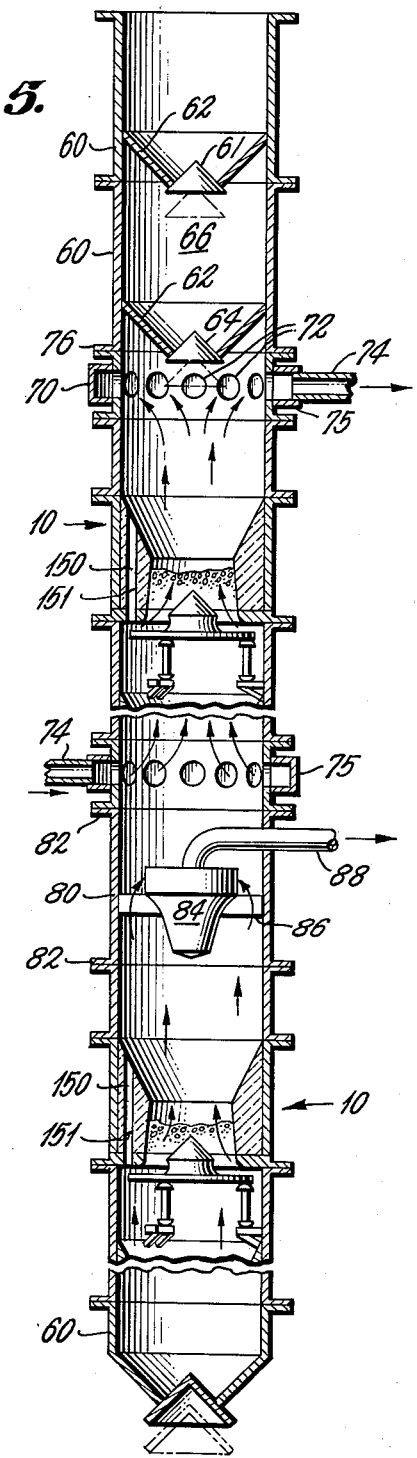

United States Patent Office 3,083,471
Patented Apr. 2, 1963

3,083,471
APPARATUS FOR CONTINUOUS AND UNIFORM CONTACTING OF FLUIDS AND SOLIDS
Morgan G. Huntington, Cathedral City, Calif., assignor to Huntington Chemical Corporation, a corporation of Utah
Filed Mar. 24, 1960, Ser. No. 17,293
10 Claims. (Cl. 34—52)

This invention relates to improvements in an apparatus for continuous and uniform contacting of fluids and solids. More particularly, the invention relates to uniformly contacting fluids and solids while keeping multiple superimposed beds of broken solids in motion and feeding the solid material downwardly in a controlled manner and simultaneously crushing any chunks of agglomerate which may form and which might otherwise interfere with the process.

Controlled contacting of solids and fluids is an essential part of a wide variety of processes, e.g., the promotion of chemical reactions, the heating or cooling of fluids and solids within specific temperature ranges and at controlled heating and cooling rates. Also such devices and methods of fluid and solid contacting are useful in the catalytic contacting of solids with fluids for such purposes as catalytic cracking, catalytic reforming, and catalytic hydrocarbon rebuilding processes as well as destructive distillation of hydrocarbonaceous materials such as the carbonization and gasification of coal, oil shale and the like. The roasting of sulfide ores, the recovery of mercury from its ores, the sintering of iron ores and the production of sponge iron and similar processes may be carried on in such apparatus.

In processes where both solids and fluids are continuously introduced into a reactor or contacting vessel, no known device has so far proven to be entirely satisfactory for intimate contact therebetween. The penalties for such imperfect operation have included a much longer materials retention time and smaller throughput with the inevitable overheating and greater changes in the initial character of the primary volatile matter than would be the case were these solids and fluids uniformly contacted at accurately controlled temperatures and heated or cooled at precisely predictable rates.

There are a number of difficulties inherent in known internally heated retorts and fluid-solid contactors. One of these difficulties is the channeling of the fluids such as a thermal carrier gas through the unsorted solids and consequently overheating and/or underheating a fraction of these solids. Another difficulty is excessive entrainment of the solids in thermal carrier gases where the solids are small in size and the velocity of the gases is relatively high. This limits the materials throughput of a countercurrent gas-solid contactor because the erosive power of a fluid varies as the square of its velocity. For example, superficial velocities (by superficial is meant the fluid velocity in a vessel not occupied by the broken solids) greater than two feet a second will usually entrain substantially all finer sized solid materials.

It is also necessary to completely and precisely control the rates and uniformity of sensible heat transfer in fluid-solid contactors if these contactors are being used for chemical processes requiring close heat control. For example, overheating and destructive pyrolysis of volatile matter including nitrogenous compounds, distilled from hydrocarbonaceous materials is an outstanding defect in the so-called low temperature coal carbonization process.

Because of the difficulties of the known fluid-solid contactors in internally heated retorts discussed briefly above, the principal defect is a limitation in the material throughput rate. This limitation may be partially due to the erosive power of the thermal carrier fluids as well as excessive entrainment of the solids in the fluids. Other limitations on the throughput rate include the tendency of certain materials to agglomerate and to build up accretions on the retort walls resulting in the interruption of the operation and also resulting in uneven and erratic descent of solid materials. Also, a low volumetric sensible heat content of the thermal carrier medium fluid will limit the material throughput rate.

This invention overcomes the shortcomings and deficiencies of known fluid-solid contactors and internally heated retorts and insures good and uniform contact and controlled heating rates so that materials retention time in the retort is minimized and uniform and continuous operation is insured and maximum material throughput is thereby realized.

The apparatus of this invention further provides for a very substantial increase in material throughput as compared to known prior fluid-solid contacting apparatuses and retorting systems. In addition to the provision for optimum contacting of fluids and solids, this process and apparatus increases the material throughput in numerous ways: For example, usually at least 50 percent of the total required thermal input may be accomplished by drying and pre-heating at system pressure, thereby increasing normal throughput by a factor of two or more. Also, the gas-solids contacting system of this invention provides for system pressure of 2, 5, 10, 20 or even 30 atmospheres or above, depending upon the objectives of the particular process, and thereby increases the sensible heat content per unit volume of the thermal carrier fluid to a proportionate degree. Therefore, the superficial velocities of thermal carrier fluids may be held below some two feet per second and yet thermal transfer between the thermal carrier fluids and solids may be substantially increased over that of any known internally heated retorts and fluid-solids contactors operating at atmospheric pressures. In some cases, using sized solids, fluid velocities may be such as to cause the solids to teeter and to become fluidized in this multiple shelf system.

Furthermore, the system of this invention generally provides for the treatment of unsized and finely divided solid material. As is well established, heat transfer rates per unit volume of solids being contacted by fluids increases directly as the total particle surface area and as the volumetric sensible heat content of the gases. Therefore, fine division or crushing of the solids and pressurizing of the fluids in the system produces a multiple effect in the heat transfer rates.

The agglomerating and wall scabbing tendencies of certain solid materials such as coking coal being carbonized will not seriously affect the operation of the system of this invention because of a novel gyratory retort mechanism which includes a movable retort shelf having a gyrating action, the vertical component of which will act to shear the material off of the walls of the retort. At the same time, the gyrating action of the retort is utilized to exert a moderate crushing action on any agglomerated chunks. Because of a gyrating crowding head fixed to the retort shelf, the solid material is continuously crowded over the edge of the retort shelf thus forcing uniform contacting with the thermal carrier fluids.

Channeling of the thermal carrier fluids through the solids is prevented by supporting the solids on multiple gyrating shelves so that the beds of solids are continuously in motion and channeling does not have a chance to get started.

Certain arrangements of the fluid-solid multiple shelf contactor may provide means for accomplishing a variety of separate and distinct functions within a single continuous vessel to carry out known fluid-solid contacting processes. Separation of several functions may be effected by carrying such a great depth of solids on certain of the gyrating shelves that fluid pressure drop is increased to the extent that fluids cannot flow in important quantities from one section into another. Therefore, the fluid may be selectively withdrawn or bypassed through passages provided in a refractory lining within the pressure shell, thus not requiring outside bypass conduits which would have to withstand full system pressures.

In the multiple shelf gyrating retort of this invention the gyrating shelves may serve several quite different functions as noted below:

Each gyrating retort shelf supports a separate bed of broken solids, the depth of which is separately and automatically controlled as a function of fluid pressure drop therethrough.

The horizontal component of the gyrating motion of each shelf provides a positive means of feeding the broken solid material over the periphery of each shelf to the shelf below, working in somewhat the same way as a standard reciprocating plate feeder.

The vertical component of the gyrating motion of the retort shelves causes a slight rise and fall of the supported beds of broken solids and causes the shearing off of scabs which might tend to form on the retort walls.

The vertical and horizontal components of the gyrating shelves cause any large chunks of agglomerate to be crowded between the impinging ring and the supporting shelf. Such impingement produces a crushing action sufficient for agglomerate to be reduced in size so that it will pass freely over the edge of the gyrating shelf. However, except for breaking of agglomerated chunks, the device is not intended to perform a crushing action per se.

Each gyrating shelf supports a bed of automatically controlled depth. Where heat transfer or chemical reaction is the purpose and in all cases where the fluid must pass in intimate contact with the broken solids, the individual bed depth will be relatively shallow. A series of very shallow beds of broken solids is very much more effective in insuring uniform fluid-solid contact than a single long column of uncertain descent.

Other advantages and objects of this invention will be pointed out in the following detailed description and illustrated in the accompanying drawings which disclose, by way of example, the principles of this invention and the best mode which has been contemplated of applying these principles.

In the drawings:

FIGURE 4 is a schematic elevation view showing a further modification of means to suspend the gyrating shelf for accomplishing the requisite gyrations.

FIGURE 5 shows how the multiple gyratory shelf units may be utilized in the continuous cylindrical pressure vessel and may be interchangeably connected to other desirable sections utilized in the pressure vessel depending upon the particular process for which it is used. The other sections or units illustrated schematically are a cyclone separator section, fluid thermal carrier inlet and outlet sections, and the hopper sections.

In general, the invention contemplates contacting solids with fluids under pressure, but certain applications may require sub-atmospheric or even atmospheric pressures. The multiple beds of broken solids are supported by gyrating retort shelves which evenly feed the solid material from the periphery of one retort shelf to the next below. Each retort shelf also carries a gyrating crowding head affixed thereto which serves to move the solid material from the center of the shelf towards the periphery.

Each individual retort section with the gyrating circular shelf, crowding head, impinging ring and support is constructed as a cylindrical unit and may be interchanged with a plurality of similar cylindrical units which may have gyrating shelves therein or which may include hopper, inlet and outlet sections, or dust separating cyclone sections. By securing a selected number of these sections together in a cylindrical, vertical vessel and pressurizing the vessel, a particular selected process may be advantageously carried out, e.g., low temperature multi-step carbonization of coal with one combination of sections or the retorting of oil shale with another combination or the catalytic cracking of petroleum with even another combination of sections.

In carrying out a process, complete control of the heat transfer rate may be accomplished by control of the thermal carrier fluid and the depth of each bed and the amount of material supported on each retort shelf. The pressure of the thermal carrier fluids may be high and the material in the retort may be crushed to present fine particles having an increased surface area for heat transfer. Because of the high pressure of the thermal carrier fluids it is not necessary to pass these fluids through the solid material at high velocities and, therefore, entrainment of solids may be effectively reduced. Furthermore, the solids are supported on a gyrating shelf and are continually in motion so that thermal carrier fluids will not continuously travel through the same portion to cause channeling.

Any gyrating shelf in this system can be loaded with a bed of such depth that the fluid pressure drop therethrough will effectively prevent the flow of fluids from one section to another. A relatively deep bed would separate fluids performing different functions in separate zones within the same vessel and the reacting fluid would either be withdrawn from the system or bypassed into a zone beyond the next adjacent zone.

Figure 1:
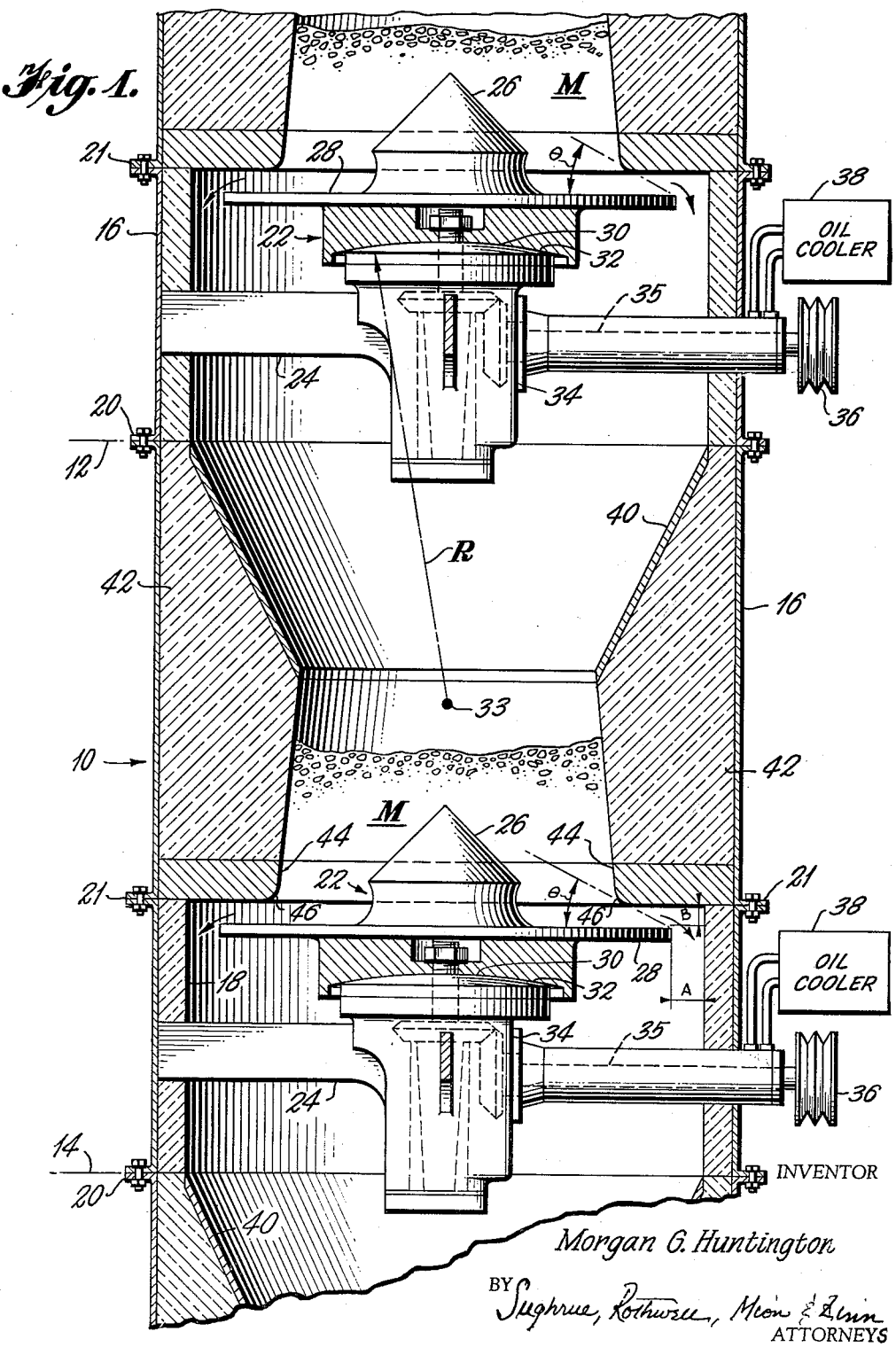
FIGURE 1 is a sectional elevation view, partially schematic, showing the multiple gyrating retort shelf and activating mechanism of this invention.

Referring to FIGURE 1, a retort 10 is defined by an upper retort dividing line 12 and a lower retort dividing line 14. The unit retort 10 includes a tubular steel shell 16 which shell is lined with insulating refractory 18. The steel shell may function as a pressure vessel. Flanged joints 20 or similar attaching means are provided at the top and bottom of the unit retort. If desired and if in certain processes it is desirable to provide an additional flanged section 21, this section may function as a variable spacer so that the height or length of the retort unit may be varied as desired.

FIGURE 1 shows in addition to unit retort 10 a bottom portion of another unit retort thereabove. Since each retort unit is identical, only retort unit 10 will be described, it being understood that each type of retort section is identical and may be assembled or disassembled at will as is described in detail hereinafter.

Within the cylindrical pressure vessel shell 16, each unit retort has a gyratory feeding shelf unit 22. This gyratory feeding and impinging unit is suitably supported from the walls of the pressure vessel of the retort wall 16 by a supporting spider 24, or in the hydraulic type the shelf may be either suspended from the impinging ring above or supported from the impinging ring next below.

The gyratory impinging and feeding unit 22 includes a crowding head 26 and an extending circular retort shelf 28 rigidly secured together. The crowding head 26 and the gyrating retort shelf 28 are attached to an oil flushed spherical bearing 30 which bearing has a surface 32 concave downwardly. The center of curvature of the spherical bearing surface 32 for the next higher retort is indicated at 33 the radius being R.

The mechanism for causing the gyrations is not critical to the invention and any known mechanism could be used. There is shown schematically a drive mechanism 34 including a drive shaft 35 and a drive pulley 36 for driving the moving portion of the gyratory feeder and crusher within an eccentric bearing 37. A mechanism for oil cooling 38 may be provided as certain processes which may utilize such gyratory multiple shelves, exchange heat with flowing fluids at rather high temperatures and require such internal cooling.

Within each unit retort near the top thereof there is a wearing shoe 40 positioned such that the solid materials falling from the next higher retort shelf will strike the wearing shoe and glance off to the gyrating shelf 28 below. In FIGURE 1 the solid material is indicated at M. Below the wearing shoe is a tapered fire brick wall 42 which is tapered from the top down and has, for example, a 1 inch in 12 inch inwall batter. At the bottom of the inwall batter there is an impinging ring 44 constructed of cast steel or the like so that it will be wear resistant. The impinging ring 44 has a rounded edge 46 facing the gyratory shelf. In process requiring high temperature operation, the impinging ring may also be fluid cooled (water, oil or liquid sodium).

In the operation of one of the gyratory retort units, the gyrating shelf 28 supports the entire content of each of the beds of broken solids. Each such bed would constitute momentarily a fixed bed of broken solids in respect to heat transfer conditions, but in other cases where materials are finer and fluid velocities are greater, each such shelf supported bed will act more like a bed of fluidized solids. The gyrating motion is obtained from a drive to drive pulley 36 through drive shaft 35 and through an ordinary gyratory actuating mechanism such as disclosed, for example, in the patent to Symons Re. 19,154 issued 1934. The gyratory motion is obtained by rotating an eccentric sleeve between a vertical shaft and a fixed bearing surface. Since the center of the radius of the spherical bearing 30 is located below the driving mechanism (as opposed to the center of the spherical bearing in the Symons patent which is located above the drive mechanism) the type of gyrating motion is somewhat different from that disclosed in the aforesaid patent although the driving mechanism is the same.

Figure 2:
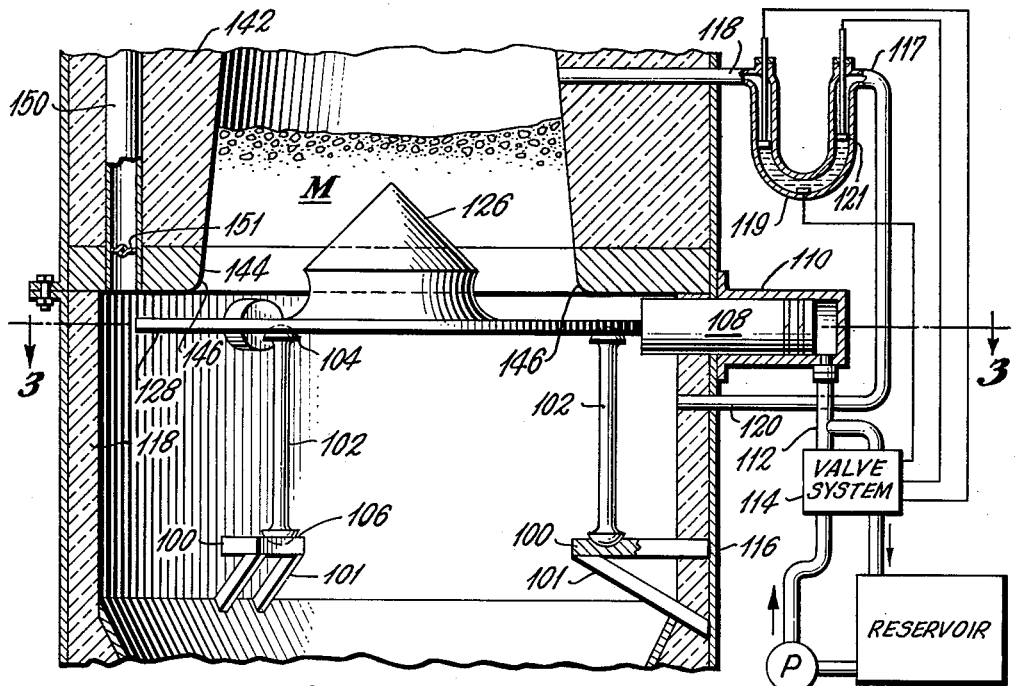
FIGURE 2 is a partly schematic sectional elevation view showing another means of creating a gyrating action for the retort shelf.

Another type of support and activating mechanism for the gyrating shelf of the retort unit is illustrated in FIG. 2. While this modification is not as massive as the crusher type of spindle mechanism illustrated in connection with FIGURE 1, it is satisfactory when operating on certain non-agglomerating or weakly agglomerating materials or with supporting beds of relatively shallow depth and light weight.

Figure 3:
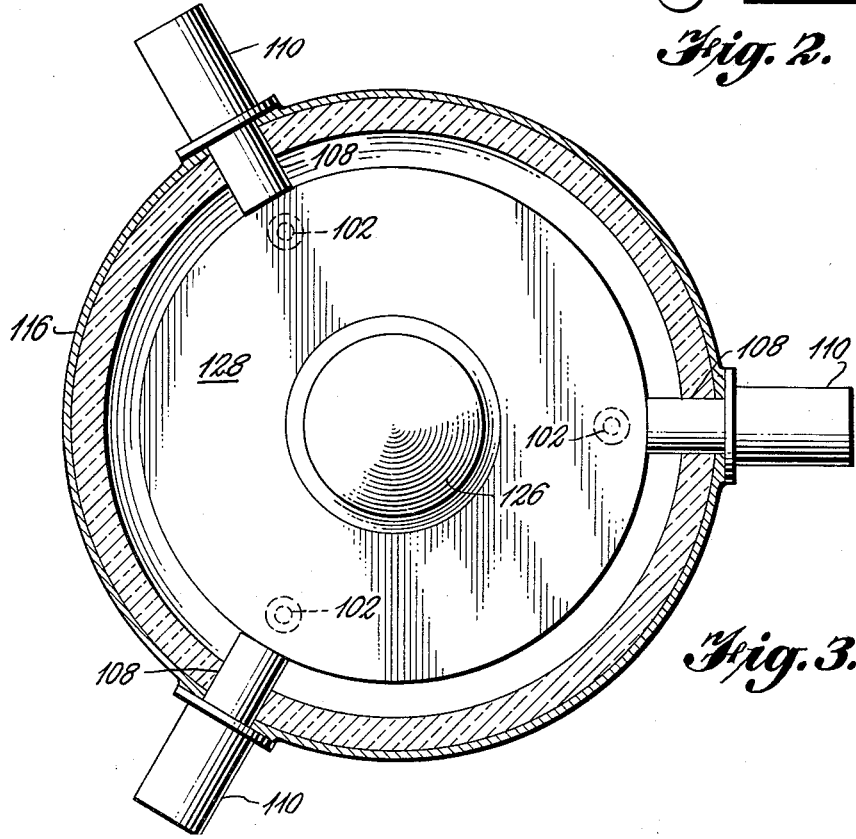
FIGURE 3 is a sectional plan view taken along line 3—3 of FIGURE 2.

The gyratory until retort includes a shelf 128 and a crowding head 126 of construction somewhat similar to that described in connection with the FIG. 1 embodiment. The shelf 128 is supported for the gyratory movement by a plurality of support links 102 which rest on a projecting support 100 braced by braces 101 attached to the cylindrical pressure vessel shell 116. The links 102 are peripherally spaced equidistant apart around the under side of shelf 128, for example, there could be three links at three points 120° apart. The ends of the links 102 terminate in spherically machined hard faces for cooperating with spherical cavities to provide a universal socket joint 104 at the connection between the link 102 and the shelf 128 and to provide a similar socket joint 106 between link 102 and the supporting ring 100. The gyratory shelf 128 is actuated by pistons 108 in cylinders 110 to cause the gyratory movement. There are a plurality of pistons 108 also spaced equi-distant around the periphery of shelf 128, for example, three piston 120° apart as shown in FIG. 3. The pistons 108 are sequentially actuated by hydraulic fluid through line 112 in accordance with a variable speed valve timing system 114; there being a suitable valve control for each piston so that they are actuated in sequence to cause the shelf 128 supported from the pivotal links 102 to transcribe a gyratory movement. The speed of the gyratory movement and the stroke of the pistons 108 can be controlled from the valve system 114.

Shown in FIG. 2, a bed of broken solids M is supported on the gyratory shelf 128. An impinging ring 144 with the rounded corner 146 is provided similar to that described in connection with FIG. 1. The refractory lining above the impinging ring 144 may have passages therein as illustrated at 150, closed by suitable valves 151. As shown in FIG. 5, the passage 15 may be utilized for selectively bypassing the thermal carrier fluid around a bed of solids M. Fluid flow through each separate retort zone may be controlled by a single valve 151 in each passage 150 since all inlet fluids are maintained at constant, near-system pressures.

To control the depth of bed of broken solids in accordance with the pressure drop of the thermal carrier fluid across the bed there is provided a manometer 117. The manometer is connected through the pressure vessel shell 116 at 118 above the bed M and at 120 below the bed of broken solids M so that it measures the fluid pressure drop across the bed. A mercury U-tube 119 of the manometer may be provided with suitable electrical contacts 121 for actuating and controlling the valve system 114 to therefore control the piston 110 and the movement of the gyratory shelf 128 in accordance with the pressure drop across the bed. Thus, the depth of the bed is controlled by the change in pressure drop across the bed for any cause. Likewise, similar control of the bed depth is effected by varying the pulley speed driving the spindle type gyratory mechanism. By this arrangement the shelf 128 will automatically carry a shallower bed of fine or unsized material than it would carry of coarse, sorted solids.

FIGURE 4 illustrates another arrangement for supporting the gyratory shelf. In this arrangement the gyratory shelf 228 and the crowding head 226 are similar to that described in the previous embodiments. The shelf may be actuated by a plurality of pistons positioned equidistant around the periphery thereof and adapted to be operated in sequence similar to that described in connection with FIG. 2. The principal difference between the FIG. 3 modification and FIG. 2 modification is the means of supporting the shelf. The shelf of the FIG. 3 modification is suspended on J-shaped links 202 having a spherical end for forming a universal joint between the bottom of the shelf 228 and the J link 202 while the top end of the J link has a spherical projection for forming a similar universal joint 206 between this J link and the supporting impinging ring 244. The impinging ring 244 and the remainder of the structure is similar to that described for previous embodiments.

The horizontal distance A between the periphery of the gyratory shelf and the inside of the enclosing walls of the pressure vessel and the vertical distance B between the top of the gyrating shelf and the bottom of the impinging ring have been indicated for an explanation of the operation of the apparatus.

If the horizontal distance A between the edge of the retort shelf and the retort wall is at a minimum, the distance B between the impinging ring and the retort shelf will be at a maximum. In other words, the edge of the retort shelf nearest the wall of the retort will be tilted downwardly more than any other portion of the retort shelf. In this way, the crowding head 26 forces the material M toward the retort impinging ring and between the impinging ring 44 and retort shelf 28 when these components are farthest apart. The radius R of the spherical bearing surface 32 determines the relation of the horizontal dimension A and the substantially vertical dimension B, i.e., the shorter the radius of generation, the greater will be dimension B as compared to dimension A for a given eccentricity.

The supported shelf activated by hydraulic pistons as shown in FIG. 2 will have approximately the same motion as though it were supported on a downwardly curved spherical bearing, i.e. the same motion as the arrangement of FIG. 1. The suspended shelf of FIG. 4, however, will have the opposite type of motion as though it were supported on a spherical bearing concave or curved upward.

During the gyration of the retort shelf 28 and crowding head 26, when dimension A is the least and dimension B is the greatest, the crowding head, which is no higher incidentally than the lowest elevation of the impinging ring, forces the solid material towards the impinging ring as the gyrating bottom tilts downwardly to its greatest extent. As the dimension B then starts getting less and the dimension A starts getting greater at this point as the gyratory shelf starts tilting upwardly, the retorted material M is slipped off the periphery of the gyrating retort shelf 28 in the manner similar to that of a reciprocating feeder. As the shelf 28 gyrates the solids M are alternately crowded under the impinging ring 44 and any agglomerated chunks therebetween are crushed sufficient to pass the aperture. The vertical component of movement of the gyrating shelf 28 is sufficient to cause the materials supported thereon to rise somewhat against the tapered in-wall batter of the fire-brick wall 42 and to keep the vessel walls scoured free of scabs and accretions.

The relatively large gyrating retort shelf 28 provides a large surface across which all the contents of each unit retort must pass and through which the hot thermal carrier gases (fluids) must flow. Through the method of causing these broken solids to flow evenly over the periphery of the gyrating shelf 28, uniform gas solid contact is assured and channelling through a stationary bed of solid material M is impossible as these broken solids are continually in motion to the extent that they are re-adjusted in position due to the gyrating of the retort shelf 28.

The angle formed between the rounded edge 46 of the impinging ring 44 and the edge of the retort shelf 28 is designated as angle $\theta$. This angle is chosen to be less at all positions of the retort shelf than the angle of repose of the solid materials being handled in the retort so that free flow of the material over the edge of the gyrating shelf cannot occur. In other words, if the retort were handling coke char and coal in a coal carbonization process, the largest angle formed between the rounded edge 46 of the impinging ring 44 and the extreme peripheral top edge of the gyrating retort shelf 28 would be less than the angle of repose of coke char and coal (about 27° from the horizontal) so that the only flow over the periphery of the gyratory retort shelf 28 is caused by the motion of the gyrating retort shelf 28 in the manner of a reciprocating feed plate and can thereby be positively controlled by controlling the speed of gyration of shelf 28.

Although the unit retort 10 described in connection with FIGURE 1 is the essential element in any fluid-solid contacting apparatus, it would, of course, be necessary to combine with the unit retort various other components for introducing and removing the thermal carrier fluids, for charging the materials into the top retort which may be under pressure, and for removing the materials from the bottom retort while the system remains pressurized. Because of the detachable unit construction these various elements can be easily inserted into a vertical stack making a tubular pressure vessel as shown, for example, in FIGURE 5.

FIGURE 5 illustrates the various separate units which may be bolted together for solving almost any imaginable fluid-solids contacting problem. Different processes require quite a different number of retort units and have different problems of introduction and removing of thermal carrier fluids and other products from the retorts. The various units which can be attached together for making the tubular pressure vessel, which in turn is supported by an external structure (not shown) are the hopper and pressurizing lock section 60, the fluid entrance and eduction section 70 and the dust separating section 80 as well as the retort sections 10 described above.

The bin or hopper section 60 includes a tapered lower wall 62 having a central opening closed by a bell valve 64. When two of these hopper units are mounted on top of one another as shown in FIGURE 2, they create an enclosed pocket such as 66 which may be a pressurizing and/or pre-heating pocket.

The thermal carrier or reacting fluids entrance and eduction section 70 includes a plurality of openings or tuyeres 72 for introducing a thermal carrier gas into the retort pressure vessel or for removing or by-passing fluids or for removing any other fluid product. As shown, an entrance and eduction pipe 74 may be suitably connected to each of the openings 72 within the pressure vessel shell by means of a manifold 75 or the like. These sections may be flanged at 76 for attaching to the retort stack at any desired place. The bypass passages 150 within the tubular pressure vessel allow the thermal carrier fluids to be selectively bypassed around the beds of solids M in each retort section 10.

The fine solids which may be entrained in the thermal carrier gases passing through the retorts may be taken out of the thermal carrier gases by means of a cyclone separator section 80. This separator section may be inserted into the retort stack at any desired place and secured thereto by its flanges 82. Within the section 80 there is a conventional cyclone separator at 84 secured to the walls of the section by a spider or the like 86 and having an eduction pipe 88 extending through the walls.

Because the various processes utilizing uniform and continuous fluid solids contacting differ so widely, e.g., coal carbonization and oil retorting, no specific chemical process has been shown for utilizing the disclosed apparatus, however, it is appreciated that known processes in the art can be practiced with this apparatus as well as processes which are not yet in being.

It can be seen that applicant has disclosed a novel apparatus and system for the uniform and continuous contacting of solids and gases. By the means of this system the solids material are fed in a controlled manner and are continually in motion while preventing any channelling of the thermal carrier fluid passing therethrough. By controlling the gyration rate and amplitude of the gyrating retort shelves 28, the speed with which the material is fed through the retort may be varied and the material stock level retained on each retort shelf may be also controlled, thus assisting in controlling the heat exchange rate and the pressure drop of the retorting operation. By crushing the solid materials finely and by passing the thermal carried fluids through the retort at a substantial pressure and a low velocity the erosive power of the thermal carrier fluid is diminished while the heat transfer to the solids material is substantially increased. By keeping the materials in the retort moving up and down on the gyrating bottom the tendency for scabs of agglomerate to form on the walls is eliminated and any large chunks of agglomerate which may form will be broken up between the impinging ring and the gyrating retort shelf. The descent of the solid materials and the individual bed depth can be regulated by varying the speed of the gyrating retort shelves. Furthermore, by combining a number of identical retort units with other units for introducing and removing the solids and fluid materials as well as certain dust separating units when needed, an unlimited number of solids-fluid contacting processes may be carried out.

While there has been shown and described and pointed out the fundamental novel features of this invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. An apparatus for fluid-solids contacting comprising; substantially vertical side wall enclosures for the solids, an inwardly projecting impinging ring attached to said side walls, a gyratory shelf for supporting the solids within the side walls and thereby keeping all the material supported continually in motion, the gyratory shelf being positioned below the impinging ring to leave a space therebetween, means for supporting and driving the gyratory shelf in a gyratory motion having a horizontal and vertical component of motion, a crowding head attached to the gyratory shelf and extending upwardly therefrom for crowding the solids material toward the side walls and the space beneath the impinging ring during gyrations, the inwardly projecting impinging ring terminating a predetermined distance above the gyratory bottom with the dimension of inward extension being such that at no time during movement of the gyratory bottom will the angle of repose of the solids being supported on the bottom be exceeded, so that during gyratory motion the solids materials will be positively fed off the periphery of the gyrating bottom, and means to introduce a fluid such that it will flow through the solids materials supported on and fed off of the gyratory shelf.

2. An apparatus as defined in claim 1 wherein the means for driving the gyratory shelf includes a spherical bearing with the center of curvature of the spherical bearing located below the gyrating shelf and an eccentric drive.

3. An apparatus as defined in claim 1 further comprising inward extensions of the side wall enclosures above the impinging ring having an inwall batter and the impinging ring being constructed of a wear resistant material.

4. An apparatus as defined in claim 1 wherein the means for supporting and driving the gyratory shelf includes a plurality of links supporting the shelf from the bottom and supported below the shelf by universal connections, and a plurality of pistons equi-distantly spaced around the periphery of the shelf and adapted to be actuated sequentially.

5. An apparatus as defined in claim 1 wherein the means for supporting and driving the gyratory shelf includes a plurality of supporting links supporting the bottom of the shelf and supported from a supporting structure above the shelf by universal connecting means, and a plurality of pistons arranged around the periphery of the shelf and cooperating therewith, the pistons being adapted to be actuated in sequence for moving the shelf which, because of its support will move in a gyratory motion.

6. In an apparatus for contacting fluids and solids in which the solids are fed vertically downward from level to level in an enclosed pressurized vessel and are selectively contacted with gaseous fluids, the improvement that comprises, a gyrating shelf mechanism at each vertical level for supporting the solids and keeping them in heaving movement, means for driving each individual shelf to accomplish gyrating movement, and an inwardly extending portion of the vessel directly above the gyratory shelf positioned in relation to the shelf so that solids carried on the shelf will not flow off the shelf by gravity alone but will be positively fed off the periphery of the shelf during the gyrating movement of the shelf to cause the shelf to feed an annular cascade of solid materials off its periphery.

7. An apparatus as defined in claim 6 wherein said inwardly extending portion of the vessel includes a wear resistant impinging ring and the gyrating shelf mechanism includes circulating liquid cooling and lubricating means.

8. An apparatus as defined in claim 6 further comprising means for controlling the drive means to allow the depth of material on each gyrating shelf to be adjusted to either allow or substantially prevent the flow of gases through the bed of solids carried on any selected shelf, means sensing conditions within the vessel in the vicinity of the solid materials for controlling said individual drive means and hence controlling the quantity of solid materials retained on and fed off the periphery of each gyrating shelf.

9. An apparatus as defined in claim 6, wherein each gyratory mechanism is attached to a separable section of the vertical pressure vessel.

10. An apparatus for continuously and uniformly contacting fluids and solids comprising; a continuous pressure type vertical vessel, a plurality of vertically spaced shelves within the vessel for supporting solid materials thereon, means supporting each of said shelves for gyratory movement to cause the solid material supported thereon to be in continual heaving movement and to allow positive feeding of said solids from each individual shelf, individual drive means for each individual gyratory shelf, an inwardly extension from the sides of said vertical vessel immediately above each gyratory shelf and spaced therefrom a distance such that the solid materials must be positively fed off the periphery of the shelf in accordance with the gyrating movements of the shelf, means to control the individual drive means for each gyratory shelf in accordance with sensed conditions within the vessel in the vicinity of the shelf driven by the individual drive means, and means for passing a thermal carrier fluid at low velocity and substantial pressure selectively through solid materials in any portion of the vertical vessel.

References Cited in the file of this patent

UNITED STATES PATENTS

| 18,137 | Custer | Sept. 8, 1857 |
| 850,039 | McKnight | Apr. 9, 1907 |
| 1,757,616 | Bunce | May 6, 1930 |
| 2,341,544 | Gruender | Feb. 15, 1944 |
| 2,669,873 | Gardner | Feb. 23, 1954 |
| 2,769,618 | Nettel | Nov. 6, 1956 |
| 2,886,334 | Presler | May 12, 1959 |
| 2,909,325 | Hunter | Oct. 20, 1959 |

FOREIGN PATENTS

| 149,774 | Great Britain | Aug. 19, 1920 |
| 227,028 | Great Britain | Jan. 8, 1925 |